(12) United States Patent
Nakanishi et al.

(10) Patent No.: US 8,530,872 B2
(45) Date of Patent: Sep. 10, 2013

(54) OPTICAL POSITION DETECTING DEVICE, ROBOT HAND, AND ROBOT ARM

(75) Inventors: Daisuke Nakanishi, Matsumoto (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 228 days.

(21) Appl. No.: 13/078,084

(22) Filed: Apr. 1, 2011

(65) Prior Publication Data

US 2011/0243702 A1   Oct. 6, 2011

(30) Foreign Application Priority Data

Apr. 2, 2010   (JP) ................ 2010-085819

(51) Int. Cl.
 *G01N 21/86* (2006.01)
 *G01T 1/29* (2006.01)
 *G06F 19/00* (2011.01)

(52) U.S. Cl.
 USPC ............ 250/559.33; 250/370.1; 700/245

(58) Field of Classification Search
 USPC ............ 250/338.1, 341.8, 342, 341.7, 370.1, 250/559.33, 216, 221, 222.1; 700/245, 248, 700/258
 See application file for complete search history.

(56) References Cited

U.S. PATENT DOCUMENTS 6,594,551 B2 * 7/2003 McKinney et al. .......... 700/258
6,953,926 B2   10/2005 Reime

FOREIGN PATENT DOCUMENTS

| JP | 2010-231505 | 11/2003 |
| JP | 2003-534554 | 10/2010 |
| JP | 2010-231504 | 10/2010 |

* cited by examiner

*Primary Examiner* — Georgia Y Epps
*Assistant Examiner* — Don Williams
(74) *Attorney, Agent, or Firm* — Harness, Dickey & Pierce, P.L.C.

(57) ABSTRACT

In an optical position detecting device, a position detecting section detects the position of a target object on the basis of a result obtained by receiving detection light, which is emitted from a light source section and reflected by the target object, using a light detection section. As seen from an emitting direction of the detection light, the light detection section is located inside a region surrounded by a closed circuit passing through a plurality of the light source sections or inside a region pinched by the plurality of light source sections. The plurality of light source sections has a first light-emitting element, and a second light-emitting element located closer to the light detection section side than the first light-emitting element. The light source driving section alternately turns on the first light-emitting element and the second light-emitting element.

12 Claims, 8 Drawing Sheets

OPTICAL POSITION DETECTING DEVICE, ROBOT HAND, AND ROBOT ARM

This application claims priority to Japanese Patent Application No. 2010-085819 filed Apr. 2, 2010 which is hereby expressly incorporated by reference herein in its entirety.

BACKGROUND

1. Technical Field

The present invention relates to an optical position detecting device which optically detects a target object.

2. Related Art

As an optical position detecting device which optically detects a target object, for example, as shown in FIG. 8, an optical position detecting device is suggested in which detection light L2 is emitted toward the target object Ob via a translucent member 40 from two detection light source sections 12, and detection light L3 reflected by the target object Ob is transmitted through the translucent member 40 and is detected by a photodetector 30. In this optical position detecting device, for example, if the two detection light source sections 12 are differentially moved on the basis of a detection result in the photodetector 30, the ratio of the distance between one detection light source section 12 of the two detection light source sections 12 and the target object Ob and the distance between the other detection light source section 12 and the target object Ob is known. Accordingly, the position of the target object Ob can be detected (refer to JP-T-2003-534554 (FIG. 10)).

However, in the configuration shown in FIG. 8, in a case where the target object Ob is inside two detection light source sections 12 as shown as the target object $Ob_1$ and in a case where the target object Ob is outside the two detection light source sections 12 as shown as the target object $Ob_2$, there is a problem in that the ratio of the distance between one detection light source section 12 of the two detection light source sections 12 and the target object Ob and the distance between the other detection light source section 12 and the target object Ob becomes equal. For this reason, when the ratio of the distance between one detection light source section 12 of the two detection light source sections 12 and the target object Ob and the distance between the other detection light source section 12 and the target object Ob is obtained, it cannot be determined whether the distance between the two detection light source sections 12 may be internally divided or externally divided.

SUMMARY

An advantage of some aspects of the invention is to provide an optical position detecting device which can detect whether a target object is outside or inside a region where a detection light source is arranged.

According to an aspect of the invention, there is provided an optical position detecting device which optically detects the position of a target object. The device includes a plurality of detection light source sections which emits detection light and is separated in a direction intersecting an emitting direction of the detection light; a photodetector which receives the detection light reflected by the target object located in an emitting-side space of the detection light; a light source driving section which sequentially turns on the plurality of detection light source sections; and a position detecting section which detects the position of the target object on the basis of a light-receiving result of the photodetector. As seen from the emitting-side space of the detection light, the photodetector is located inside the plurality of detection light source sections, and the plurality of detection light source sections includes an outer light-emitting element and an inner light-emitting element arranged inside where the photodetector is located to the outer light-emitting element, respectively. The position detecting section determines whether the target object is located either outside or inside the detection light source section on the basis of a comparison result between the light-receiving intensity in the photodetector when the outer light-emitting element is turned on and the light-receiving intensity in the photodetector when the inner light-emitting element is turned on.

In the aspect of the invention, the light source driving section sequentially turns on the plurality of detection light source sections, and the photodetector receives the detection light reflected by the target object during that time. Accordingly, if a detection result in the photodetector is directly used, or a driving current or the like when the two detection light source sections are differentially moved via the photodetector is used, the position detecting section can detect the position of the target object. Here, as seen from the emitting-side space, the photodetector is located inside the plurality of detection light source sections, and the plurality of detection light source sections includes an outer light-emitting element and an inner light-emitting element inside the outer light-emitting element, respectively. Accordingly, the position detecting section can determine whether the target object is located either outside or inside the detection light source section on the basis of a comparison result between the light-receiving intensity in the photodetector when the outer light-emitting element is turned on and the light-receiving intensity in the photodetector when the inner light-emitting element is turned on. For this reason, when the ratio of the distance between one detection light source section of the two detection light source sections and the target object and the distance between the other detection light source section and the target object is obtained, there is no doubt as to whether the distance between the two detection light source sections may be internally divided to specify the position of the target object or the distance between the two detection light source sections may be externally divided to specify the position of the target object. Therefore, the position of the target object can be accurately detected.

In the aspect of the invention, it is possible for the position detecting device to adopt a configuration in which, when the outer light-emitting element and the inner light-emitting element alternately emit light with the same intensity, the position detecting section determines that the target object is located outside the detection light source section if the light-receiving intensity in the photodetector when the outer light-emitting element emits light is larger than the light-receiving intensity in the photodetector when the inner light-emitting element emits light, and determines that the target object is located inside the detection light source section if the light-receiving intensity in the photodetector when the first light-emitting element emits light is smaller than the light-receiving intensity in the photodetector when the second light-emitting element emits light.

In the aspect of the invention, the position detecting device may adopt a configuration in which, when the outer light-emitting element and the inner light-emitting element alternately emit light with the same intensity, the position detecting section determines that the target object is located outside an intermediate position between the outer light-emitting element and the inner light-emitting element if the light-receiving intensity in the photodetector when the outer light-emitting element emits light is larger than the light-receiving intensity in the photodetector when the inner light-emitting element emits light, and determines that the target object is located inside the intermediate position between the outer light-emitting element and the inner light-emitting element if the light-receiving intensity in the photodetector when the first light-emitting element emits light is smaller than the light-receiving intensity in the photodetector when the second light-emitting element emits light.

In the aspect of the invention, it is preferable that, when the emitting direction of the detection light is defined as a Z-axis direction, and two directions intersecting the Z-axis direction are defined as an X-axis direction and a Y-axis direction, the plurality of detection light source sections includes a detection light source section separated in the X-axis direction, and a detection light source section separated in the Y-axis direction. According to this configuration, the X coordinate and Y coordinate of the target object can be detected.

In the aspect of the invention, it is preferable that the position detecting section detects the coordinate position of the target object on the basis of a result obtained by differentially moving some detection light source sections and other detection light source sections in the plurality of detection light source sections, on the basis of the light-receiving result of the photodetector. If such a differential movement is used, the influence of environmental light or the like can be automatically corrected.

In the aspect of the invention, it is preferable that the apparatus with a position detection function further includes a reference light source that emits reference light that enters the photodetector without travelling through the emitting-side space. The position detecting section detects the coordinate position of the target object on the basis of a result obtained by changing and differentially moving combinations of some detection light source sections of the plurality of detection light source sections and the light source for reference, on the basis of the light-receiving result of the photodetector. If such a differential movement is used, the influence of environmental light or the like can be automatically corrected.

In the aspect of the invention, it is preferable that the position detecting section detects the position of the target object in the emitting direction of the detection light on the basis of a light-receiving result in the photodetector when the plurality of detection light source sections is simultaneously or sequentially turned on.

In the aspect of the invention, it is preferable that the detection light is infrared light. According to this configuration, since the detection light is not viewed, the optical position detecting device can be used for various apparatuses, so as not to hinder the display even in a case where the optical position detecting device is applied to a display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 8:
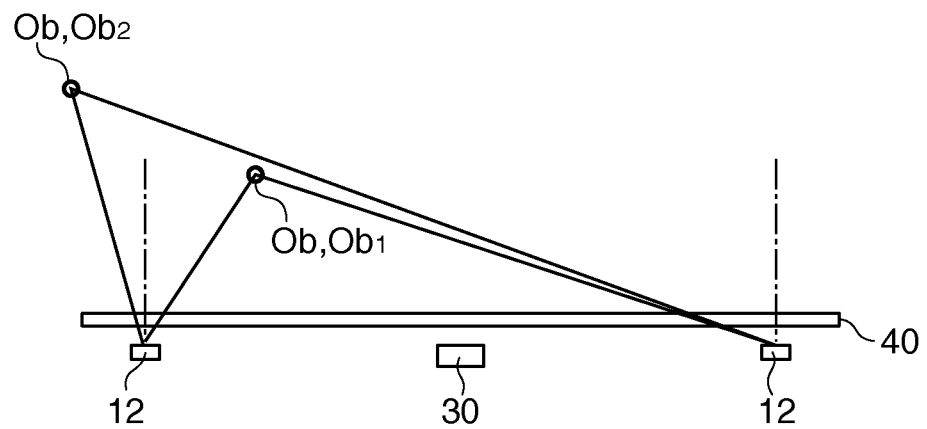
FIG. 8 is an explanatory view of a related-art optical position detecting device.

Next, embodiments of the invention will be described with reference to the accompanying drawings. In addition, in the following description, the axes which intersect each other will be described as the X-axis, the Y-axis, and the Z-axis, and the emitting direction of detection light will be described as the Z-axis direction. Additionally, in the drawings referred to below, one side of an X-axis direction is shown as X1 side, the other side thereof is shown as X2 side, one side of a Y-axis direction is shown as Y1 side, and the other side thereof is shown as Y2 side. Additionally, in the following description, corresponding constituent elements will be designated by the same reference numerals, and will be described so as to make correspondence to constituent elements shown in FIG. 8 easily understood.

Overall Configuration

Figure 1A:
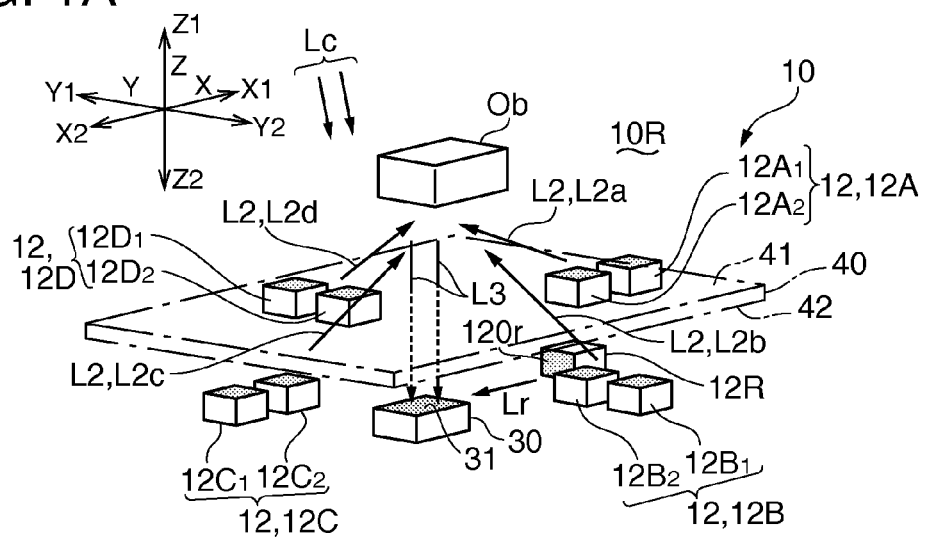
FIGS. 1A to 1C are explanatory views showing sections of an optical position detecting device.
Figure 1B:
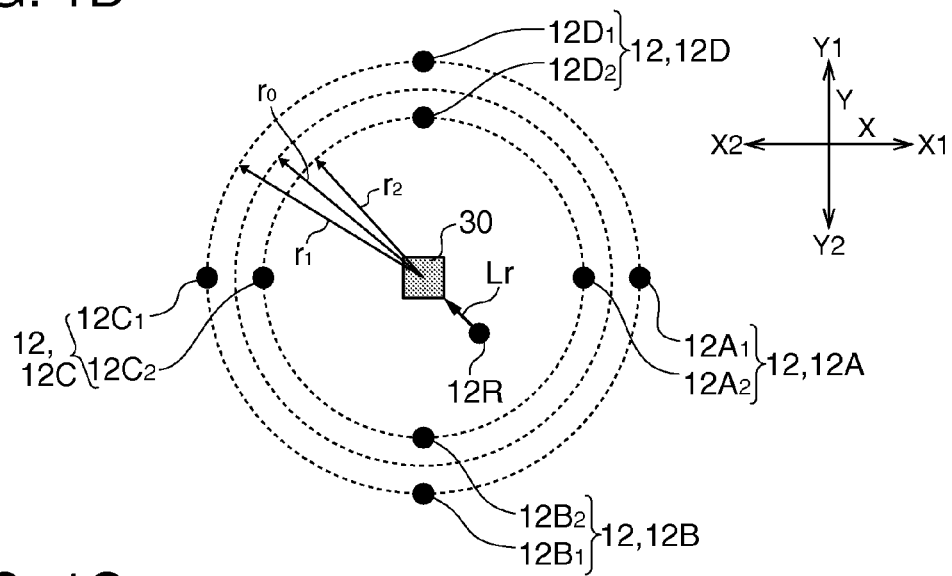
Figure 1C:
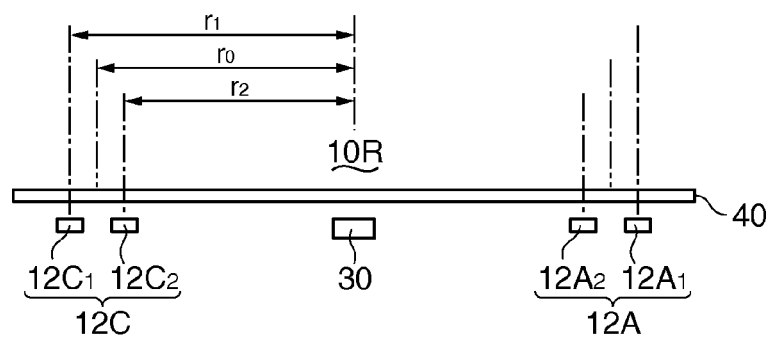
Figure 2:
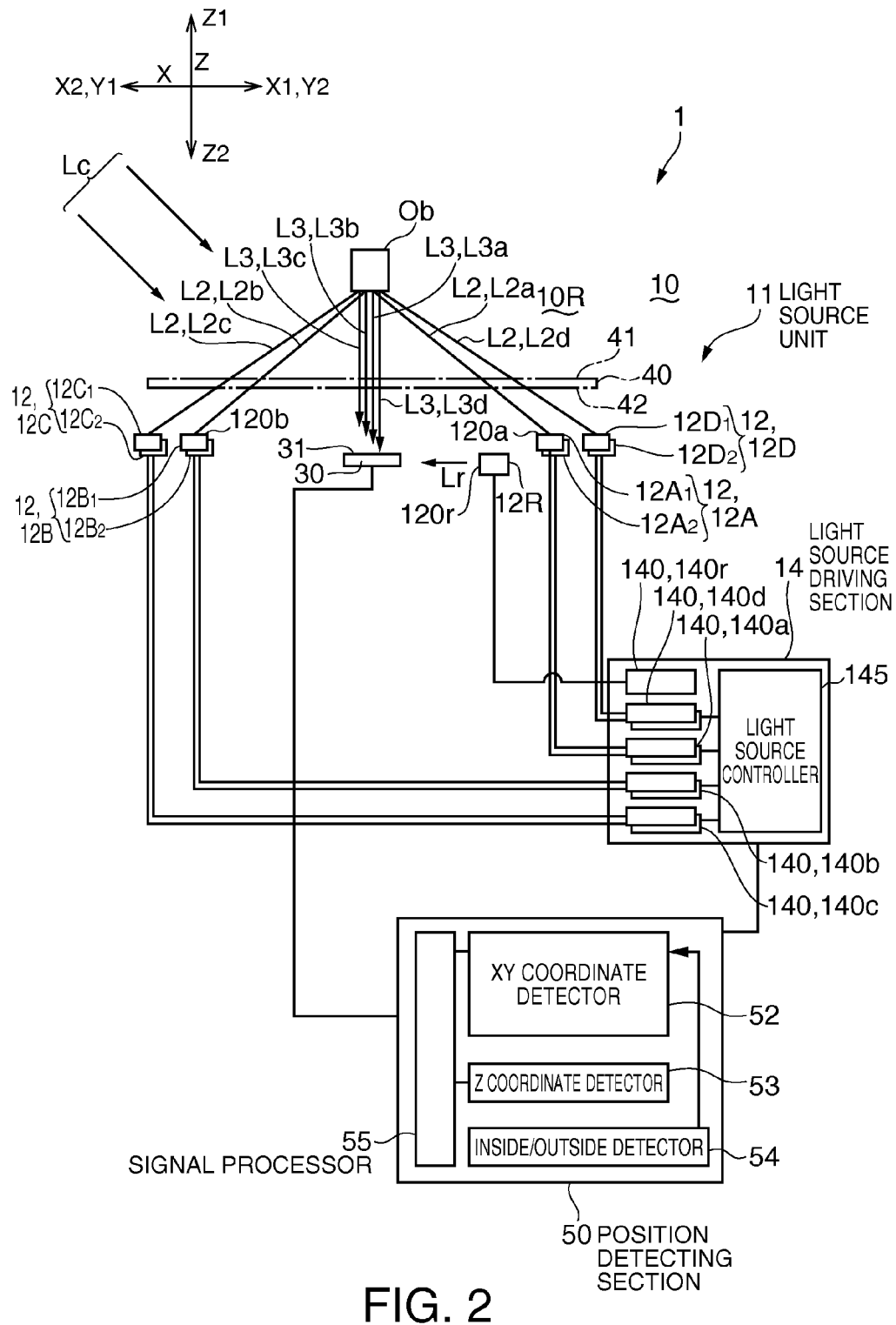
FIG. 2 is an explanatory view showing the overall configuration of the optical position detecting device.

FIGS. 1A to 1C are explanatory views showing sections of an optical position detecting device to which the invention is applied, wherein FIGS. 1A, 1B and 1C are: an explanatory view showing a three-dimensional configuration of constituent elements of the optical position detecting device; an explanatory view showing a planar configuration of the constituent elements of the optical position detecting device; and an explanatory view when the constituent elements of the optical position detecting device are seen from the side. FIG. 2 is an explanatory view showing the overall configuration of the optical position detecting device to which the invention is applied.

In FIGS. 1A to 1C and FIG. 2, the optical position detecting device 10 of the present embodiment is an optical device used as a tactile sensor in a robot hand unit or the like, and includes a light source unit 11 including a plurality of detection light source sections 12 which emit detection light L2 toward the one side Z1 in the Z-axis direction, and a photodetector 30 which detects detection light L3 reflected by the target object Ob. Additionally, the optical position detecting device 10 may have a sheet-shaped or plate-shaped translucent member 40. In this case, the detection light source sections 12 emit the detection light L2 toward a first surface 41 from a second surface 42 side opposite to the first surface 41 side in the translucent member 40, and the photodetector 30 detects the detection light L3 which has been reflected by the target object Ob and has been transmitted through the second surface 42 side of the translucent member 40. For this reason, a light-receiving portion 31 of the photodetector 30 faces the second surface 42 of the translucent member 40.

In the present embodiment, the light source unit 11 includes a first detection light source section 12A, a second detection light source section 12B, a third detection light source section 12C, and a fourth detection light source section 12D as a plurality of detection light source sections 12, and these detection light source sections 12 all have light-emitting portions which are directed toward the translucent member 40. Accordingly, the detection light L2 emitted from the detection light source sections 12 is transmitted through the translucent member 40 and is emitted to the first surface 41 side (the emitting-side space of the detection light L2 from the light source unit 11). In the present embodiment, a detection space 10R where the position of the target object Ob is detected is constituted by this emitting-side space (the space on the side of the first surface 41).

The first detection light source section 12A, the second detection light source section 12B, the third detection light source section 12C, and the fourth detection light source section 12D are arranged in this order around the central optical axis of the photodetector 30 as seen from the detection space 10R (Z-axis direction), and the photodetector 30 is located inside the region surrounded by the plurality of detection light source sections 12 as seen from the detection space 10R (Z-axis direction). In the plurality of detection light source sections 12, the first detection light source section 12A and the third detection light source section 12C are separated from each other in the X-axis direction, and the second detection light source section 12B and the fourth detection light source section 12D are separated from each other in the Y-axis direction. In addition, the second detection light source section 12B and the fourth detection light source section 12D are also separated from each other in the X-axis direction with respect to the first detection light source section 12A as seen from the first detection light source section 12A, and the second detection light source section 12B and the fourth detection light source section 12D are also separated from each other in the X-axis direction with respect to the third detection light source section 12C as seen from the third detection light source section 12C. Similarly, the first detection light source section 12A and the third detection light source section 12C are also separated from each other in the Y-axis direction with respect to the second detection light source section 12B as seen from the second detection light source section 12B, and the first detection light source section 12A and the third detection light source section 12C are also separated from each other in the Y-axis direction with respect to the fourth detection light source section 12D as seen from the fourth detection light source section 12D.

Additionally, as seen from the detection space 10R (Z-axis direction), the first detection light source section 12A, the second detection light source section 12B, the third detection light source section 12C, and the fourth detection light source section 12D are arranged at equal angular intervals about the photodetector 30. Additionally, as seen from the detection space 10R (Z-axis direction), the first detection light source section 12A, the second detection light source section 12B, the third detection light source section 12C, and the fourth detection light source section 12D have the same distance from the photodetector 30.

Additionally, the light source unit 11 also includes a reference light source 12R in which a light-emitting portion 120r is directed to the photodetector 30. The reference light source 12R is constituted by an LED (light emission diode) or the like, and the reference light source 12R emits reference light Lr of infrared light having a peak wavelength located within a range of 840 to 1000 nm as divergence light. Here, the reference light Lr emitted from the reference light source 12R does not enter the first surface 41 side (detection space 10R) of the translucent member 40, but enters the photodetector 30, without travelling through the detection space 10R, by the orientation of the reference light source 12R, a light-shielding cover (not shown) provided in the reference light source 12R, or the like.

The photodetector 30 includes a photodiode, a photo transistor, or the like in which the light-receiving portion 31 is directed to the translucent member 40. In the present embodiment, the photodetector 30 is a photodiode including a sensitivity peak of an infrared region.

Detailed Configuration of Detection Light Source Section 12

In the optical position detecting device 10 of the present embodiment, each of a plurality of detection light source sections 12 includes two light-emitting elements lined up in the radial direction, as seen from the detection space 10R (Z-axis direction). More specifically, first, the first detection light source section 12A includes an outer light-emitting element $12A_1$, and an inner light-emitting element $12A_2$ closer to the photodetector 30 side (inner side) than the outer light-emitting element $12A_1$, and the outer light-emitting element $12A_1$, the inner light-emitting element $12A_2$, and the photodetector 30 are arranged on the same straight line. Additionally, the second detection light source section 12B, similarly to the first detection light source section 12A, also includes an outer light-emitting element $12B_1$, and an inner light-emitting element $12B_2$ closer to the photodetector 30 side (inner side) than the outer light-emitting element $12B_1$, and the outer light-emitting element $12B_1$, inner light-emitting element $12B_2$, and the photodetector 30 are arranged on the same straight line. Additionally, the third detection light source section 12C, similarly to the first detection light source section 12A, also includes an outer light-emitting element $12C_1$, and an inner light-emitting element $12C_2$ closer to the photodetector 30 side (inner side) than the outer light-emitting element $12C_1$, and the outer light-emitting element $12C_1$, the inner light-emitting element $12C_2$, and the photodetector 30 are arranged on the same straight line. Additionally, the fourth detection light source section 12D, similarly to the first detection light source section 12A also includes an outer light-emitting element $12D_1$, and an inner light-emitting element $12D_2$ closer to the photodetector 30 side (inner side) than the outer light-emitting element $12D_1$, and the outer light-emitting element $12D_1$, the inner light-emitting element $12D_2$, and the photodetector 30 are arranged on the same straight line.

Here, the outer light-emitting elements $12A_1$ to $12D_1$ are all located on the circumference of a radius $r_1$ with the photodetector 30 as a center, and the inner light-emitting elements $12A_2$ to $12D_2$ are all located on the circumference of a radius $r_2$ (here, $r_1 > r_2$) with the photodetector 30 as a center. In addition, a circle with the radius $r_0$ (here, $r_0 = (r_1 + r_2)/2$) located at the center between a circle with the radius $r_1$ and a circle with the radius $r_2$ is also expressed in FIG. 1B.

Here, the outer light-emitting elements $12A_1$ to $12D_1$ and the inner light-emitting elements $12A_2$ to $12D_2$ are respectively constituted by light-emitting elements, such as LEDs (light emission diodes), and emit the detection light L2 (detection light L2a to L2d) of infrared light having a peak wavelength located within a range of 840 to 1000 nm as divergence light.

Configuration of Position Detecting Section or the Like

As shown in FIG. 2, the light source unit 11 includes a light source driving section 14 which drives the plurality of detection light source sections 12. The light source driving section 14 includes a light source driving circuit 140 which drives the detection light source section 12 and the reference light source 12R, and a light source controller 145 which controls on/off pattern of each of the reference light source 12R and the detection light source section 12 via the light source driving circuit 140. The light source driving circuit 140 includes light source driving circuits 140a to 140d which drive the first detection light source section 12A to the fourth detection light source section 12D, and a light source driving circuit 140r which drives the reference light source 12R. Additionally, the light source driving circuits 140a to 140d individually drive the outer light-emitting elements $12A_1$ to $12D_1$ and the inner light-emitting elements $12A_2$ to $12D_2$, respectively. The light source controller 145 controls all the light source driving circuits 140a to 140d, and 140r. In addition, as for the light source driving circuits 140a to 140d, it is also possible to adopt a configuration in which the outer light-emitting elements $12A_1$ to $12D_1$ and the inner light-emitting elements $12A_2$ to $12D_2$ are individually driven by switching circuits. In this case, only one light source driving circuit 140 is required.

The position detecting section 50 is electrically connected to the photodetector 30, and a detection result in the photodetector 30 is output to the position detecting section 50. The position detecting section 50 includes a signal processor 55 for detecting the position of the target object Ob on the basis of the detection result in the photodetector 30, and this signal processor 55 includes an amplifier, a comparator, or the like. Additionally, the position detecting section 50 includes XY coordinate detector 52 which detects the XY coordinates of the target object Ob, and the Z coordinate detector 53 which detects the Z coordinate of the target object Ob. Additionally, when the position detecting section 50 detects the X coordinate and Y coordinate of the target object Ob, the position detecting section also includes an inside/outside detector 54 which detects whether the target object Ob is located inside or located outside the detection light source section 12. The position detecting section 50 and the light source driving section 14 which are configured in this way operate to interlock with each other, and perform the position detection which will be described below.

Principle of Inside/Outside Detection

FIGS. 3A to 3E are explanatory views showing the principle of inside/outside determination of the target object Ob which is performed by the optical position detecting device 10 to which the invention is applied.

In the optical position detecting device 10 of the present embodiment, as will be described below with reference to FIGS. 4A to 5B, the ratio of the distance between one detection light source section 12 of the two detection light source sections 12 and the target object Ob and the distance between another detection light source section 12 and the target object Ob is obtained by the differential movement between the detection light source sections 12 or the differential movement between the detection light source section 12 and the reference light source 12R, and the position of the target object Ob is detected on the basis of this ratio. Although any of the outer light-emitting elements $12A_1$ to $12D_1$ and the inner light-emitting elements $12A_2$ to $12D_2$ may be used during this differential movement, a case where the outer light-emitting elements $12A_1$ to $12D_1$ are used is illustrated in the following description.

Figure 3A:
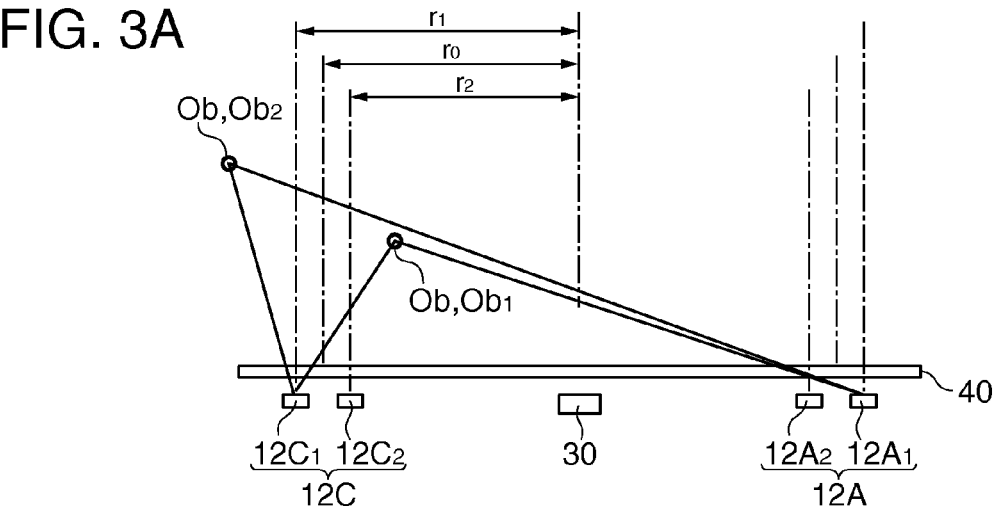
FIGS. 3A to 3E are explanatory views showing the principle of inside/outside determination of a target object Ob which is performed by the optical position detecting device.

Additionally, in the present embodiment, before and after the ratio of the distance between one detection light source section 12 of the two detection light source sections 12 and the target object Ob and the distance between the other detection light source section 12 and the target object Ob is obtained by the differential movement, it is detected whether the target object Ob is located inside the two detection light source sections 12 as shown as a target object $Ob_1$ in FIG. 3A or whether the target object Ob is located outside the two detection light source sections 12 as shown as a target object $Ob_2$ in FIG. 3A.

Hereinafter, an example of an inside/outside detection method will be described wherein the target object Ob is determined to be inside or outside the third detection light source section 12C when the coordinates of the target object Ob are detected. In the present embodiment, first, the ratio of the distance between the outer light-emitting element $12A_1$ and the target object Ob and the distance between the outer light-emitting element $12C_1$ and the target object Ob is obtained by the differential movement between the outer light-emitting elements $12A_1$ and $12C_1$ or the differential movement between the outer light-emitting element $12A_1$ or $12C_1$ and the reference light source 12R.

Additionally, before or after this ratio is obtained, the outer light-emitting element $12C_1$ and the inner light-emitting element $12C_2$ used for the third detection light source section 12C are alternately turned on, and the detection light L2 is made to emit with the same intensity. Then, in the inside/outside detector 54, the light-receiving intensity in the photodetector 30 when the outer light-emitting element $12C_1$ is turned on and the light-receiving intensity in the photodetector 30 when the inner light-emitting element $12C_2$ is turned on is compared with each other. On the basis of this comparison result, it is detected whether the target object Ob is located either outside or inside the third light source section 12C.

Figure 3B:
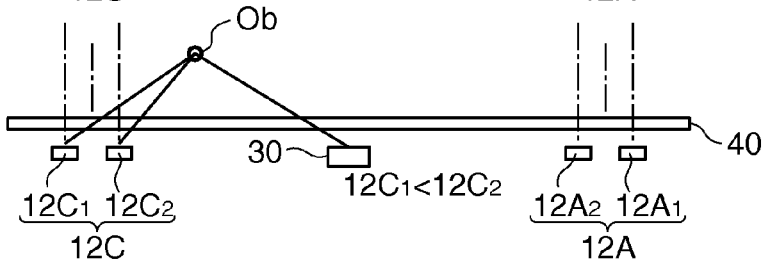

More specifically, as shown in FIG. 3B, in a case where the target object Ob is inside the third detection light source section 12C, the distance between the target object Ob and the outer light-emitting element $12C_1$ is longer than the distance between the target object Ob and the inner light-emitting element $12C_2$. Accordingly, the detection intensity in the photodetector 30 when the outer light-emitting element $12C_1$ is turned on is smaller than the light-receiving intensity in the photodetector 30 when the inner light-emitting element $12C_2$ is turned on. Accordingly, the inside/outside detector 54 can determine that the target object Ob is inside the third detection light source section 12C. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first detection light source section 12A and the third detection light source section 12C is internally divided.

Figure 3C:
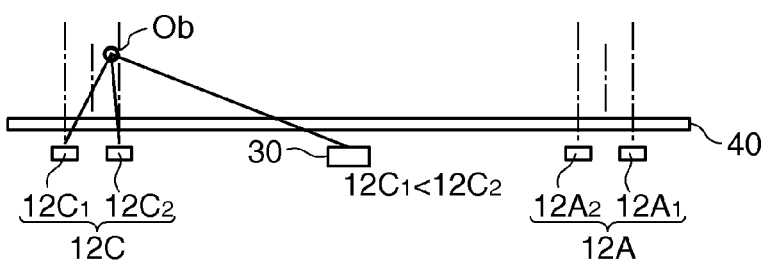
Figure 3D:
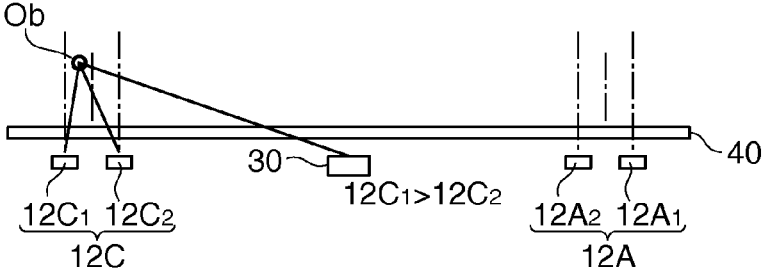
Figure 3E:
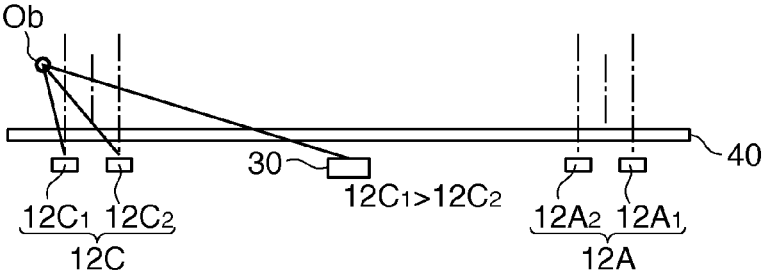

On the other hand, as shown in FIG. 3E, in a case where the target object Ob is outside the third detection light source section 12C, the distance between the target object Ob and the outer light-emitting element $12C_1$ is shorter than the distance between the target object Ob and the inner light-emitting element $12C_2$. Accordingly, the detection intensity in the photodetector 30 when the outer light-emitting element $12C_1$ is turned on is larger than the light-receiving intensity in the photodetector 30 when the inner light-emitting element $12C_2$ is turned on. Accordingly, the inside/outside detector 54 can determine that the target object Ob is outside the third detection light source section 12C. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first detection light source section 12A and the third detection light source section 12C is externally divided.

In addition, in a case where the distance between the outer light-emitting element $12C_1$ and the inner light-emitting element $12C_2$ is narrow in the third detection light source section 12C, as shown in FIGS. 3B and 3C, irrespective of whether the target object Ob is at any position near the outer light-emitting element $12C_1$ or the inner light-emitting element $12C_2$, the detection error of the coordinates of the target object Ob is small even if the above method is adopted.

Here, in a case where the distance between the outer light-emitting element $12C_1$ and the inner light-emitting element $12C_2$ is large in the third detection light source section 12C, the coordinates of the target object Ob may not be performed with a region surrounded by the circle with the radius $r_0$ (here, $r_0=(r_1+r_2)/2$) located at the center between the circle with the radius $r_1$ and the circle with the radius $r_2$ as an effective region and with the outside of the region surrounded by the circle with the radius $r_0$ as an invalid region.

That is, as shown in FIG. 3C, in a case where the target object Ob is located in a region near the inner light-emitting element $12C_2$ between the outer light-emitting element $12C_1$ and the inner light-emitting element $12C_2$, the distance between the target object Ob and the outer light-emitting element $12C_1$ is longer than the distance between the target object Ob and the inner light-emitting element $12C_2$. Accordingly, when the outer light-emitting element $12C_1$ and the inner light-emitting element $12C_2$ used for the third detection light source section 12C are alternately turned on and the detection light L2 is made to emit with the same intensity, the detection intensity in the photodetector 30 when the outer light-emitting element $12C_1$ is turned on is smaller than the light-receiving intensity in the photodetector 30 when the inner light-emitting element $12C_2$ is turned on. Accordingly, the inside/outside detector 54 can determine that the target object Ob is inside a region surrounded by the circle with the radius $r_0$, i.e., inside the outer light-emitting element $12C_1$. Therefore, when the XY coordinate detector 52 specifies the coordinates of the target object Ob on the basis of the ratio of the distance between the outer light-emitting element $12A_1$ and the target object Ob and the distance between the outer light-emitting element $12C_1$ and the target object Ob, the distance between the first detection light source section 12A and the third detection light source section 12C is internally divided.

On the other hand, as shown in FIG. 3D, in a case where the target object Ob is located in a region near the outer light-emitting element $12C_1$ between the outer light-emitting element $12C_1$ and the inner light-emitting element $12C_2$, the distance between the target object Ob and the outer light-emitting element $12C_1$ is shorter than the distance between the target object Ob and the inner light-emitting element $12C_2$. Accordingly, irrespective of whether the target object Ob is inside the outer light-emitting element $12C_1$, the detection intensity in the photodetector 30 when the outer light-emitting element $12C_1$ is turned on is larger than the light-receiving intensity in the photodetector 30 when the inner light-emitting element $12C_2$ is turned on. In such a case, the inside/outside detector 54 stops detection of the coordinates of the target object Ob assuming that the target object Ob is outside the region surrounded by the circle with the radius $r_0$. According to this method, in a case where the target object Ob is at least inside the region surrounded by the circle with the radius $r_0$, the coordinates of the target object Ob can be detected with high precision.

In addition, in the present embodiment, the above inside/outside determination is performed in all of the first detection light source sections 12A to the fourth detection light source sections 12D. For this reason, even in a case where the target object Ob is located in the angular direction which intersects the X-axis direction and the Y-axis direction, it can be determined that the target object Ob is located either inside or outside the first detection light source section 12A to the fourth detection light source section 12D. Accordingly, the XY coordinates of the target object Ob can be detected with high precision.

Basic Detection Principle of Coordinates

Figure 4A:
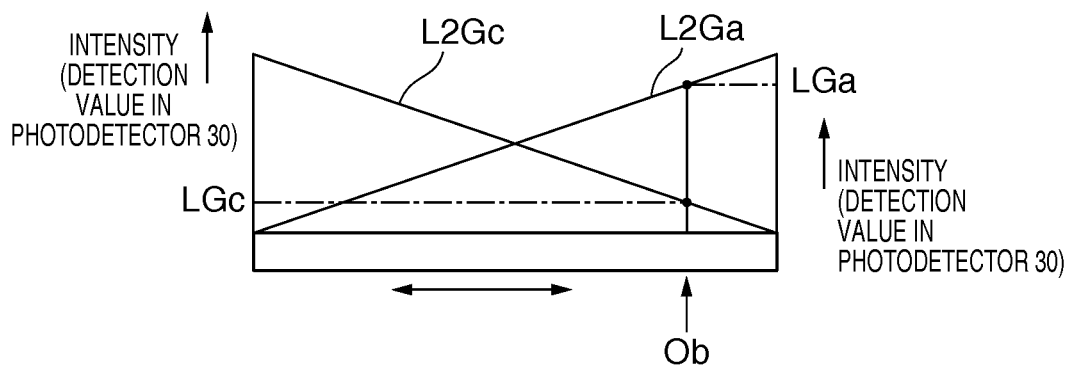
FIGS. 4A and 4B are explanatory views showing a principle that the position of a target object is detected using the differential movement between detection light beams, in the optical position detecting device.
Figure 4B:
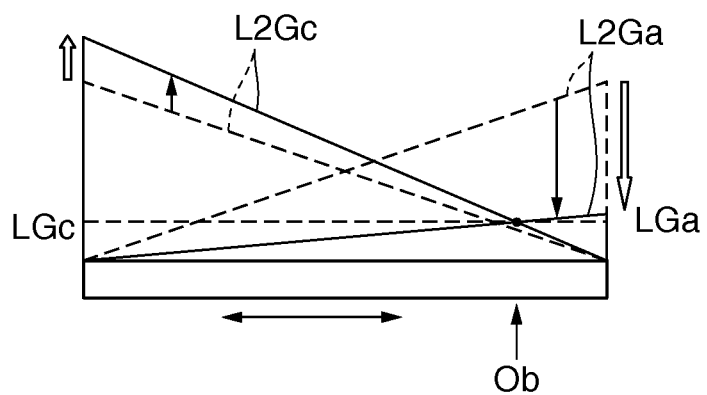

FIGS. 4A and 4B are explanatory views showing the basic principle of coordinate detection used in the optical position detecting device 10 to which the invention is applied. FIGS. 4A and 4B are an explanatory view showing the relationship between the position of the target object Ob and the light-receiving intensity in the photodetector 30, and an explanatory view showing that the light-emitting intensity of the detection light L2 is adjusted so that the light-receiving intensities in the light detection section 30 become equal to each other.

In the optical position detecting device 10 of the present embodiment, as will be described below with reference to FIGS. 4A and 4B and FIGS. 5A and 5B, the position detecting section 50 obtains the ratio of the distance between one detection light source section 12 of the two detection light source sections 12 and the target object Ob and the distance between another detection light source section 12 and the target object Ob by the differential movement between the detection light source sections 12 or the differential movement between the detection light source section 12 and the reference light source 12R, and detects the position of the target object Ob on the basis of this ratio.

Hereinafter, the basic principle when the X coordinate and Y coordinate of the target object Ob are detected from a plurality of results obtained by changing and differentially moving combinations of two detection light sources among the first detection light source section 12A, the second detection light source section 12B, the third detection light source section 12C, and the fourth detection light source section 12D on the basis of the light-receiving result of the photodetector 30 will be described.

In the optical position detecting device 10 of the present embodiment, the detection space 10R is set on a first surface 41 side (space on the emitting side of the detection light L2 from the light source unit 11) of the translucent member 40. Additionally, two detection light source sections 12, for example, the first detection light source section 12A and the third detection light source section 12C, are separated from each other in the X-axis direction and Y-axis direction. For this reason, when the outer light-emitting element $12A_1$ of the first detection light source section 12A is turned up and the detection light L2a is emitted, the detection light L2a, as shown in FIG. 4A, forms a first light intensity distribution L2Ga in which intensity decreases monotonously toward the other side from one side. Additionally, when the outer light-emitting element $12C_1$ of the third detection light source section 12C is turned up and detection light L2c is emitted, the detection light L2c is transmitted through the translucent member 40, and forms a second light intensity distribution L2Gc in which intensity increases monotonously on the first surface 41 side (detection space 10R) toward the other side from one side.

In order to obtain the positional information on the target object Ob using the differential movement between the detection light L2a and L2c, first, as shown in FIG. 4A, the outer light-emitting element $12A_1$ of the first detection light source section 12A is turned on, the outer light-emitting element $12C_1$ of the third detection light source section 12C is turned off, and the first light intensity distribution L2Ga in which intensity decreases monotonously toward the other side from one side is formed. Additionally, the outer light-emitting element 12A₁ of the first detection light source section 12A is turned off, the outer light-emitting element 12C₁ of the third detection light source section 12C is turned on, and the second light intensity distribution L2Gc in which intensity increases monotonously toward the other side from one side is formed. Accordingly, when the target object Ob is arranged in the detection space 10R, the detection light L2 is reflected by the target object Ob, and a portion of the reflected light is detected by the photodetector 30. In that case, the reflection intensity in the target object Ob is proportional to the intensity of the detection light L2 at a place where the target object Ob is located, and the light-receiving intensity in the photodetector 30 is proportional to the reflection intensity in the target object Ob. Accordingly, the light-receiving intensity in the photodetector 30 has a value corresponding to the position of the target object Ob. Therefore, as shown in FIG. 4B, if the ratio of a driving current when the controlled variable (driving current) for the outer light-emitting element 12A₁ of the first detection light source section 12A is adjusted and a driving current when the controlled variable (driving current) for the outer light-emitting element 12C₁ of the third detection light source section 12C is adjusted, the ratio of the amounts of adjustment, or the like is used so that a detection value LGa in the photodetector 30 when the first light intensity distribution L2Ga is formed and a detection value LGc in the photodetector 30 when the second light intensity distribution L2Gc is formed become equal, it can be detected whether the target object Ob exists at any position between the outer light-emitting element 12A₁ of the first detection light source section 12A and the outer light-emitting element 12C₁ of the third detection light source section 12C within the XY plane.

More specifically, as shown in FIG. 4A, the first light intensity distribution L2Ga and the second light intensity distribution L2Gc are formed so that the light intensity distributions become opposite directions to each other. In this state, it can be seen that, if the detection values LGa and LGc in the photodetector 30 are equal to each other, the target object Ob is located at the center between the outer light-emitting element 12A₁ of the first detection light source section 12A and the outer light-emitting element 12C₁ of the third detection light source section 12C within the XY plane. On the other hand, in a case where the detection values LGa and LGc in the photodetector 30 are different from each other, as shown in FIG. 4B, the first light intensity distribution L2Ga and the second light intensity distribution L2Gc are sequentially formed again by adjusting the controlled variable (driving current) for the outer light-emitting element 12A₁ of the first detection light source section 12A and the outer light-emitting element 12C₁ of the third detection light source section 12C so that the detection values LGa and LGc become equal to each other. As a result, if the detection values LGa and LGc in the photodetector 30 become equal to each other, and the ratio of a driving current for the outer light-emitting element 12A₁ of the first detection light source section 12A and a driving current for the outer light-emitting element 12C₁ of the third detection light source section 12C at that time is used, it can be detected whether the target object Ob exists at any position between the outer light-emitting element 12A₁ of the first detection light source section 12A and the outer light-emitting element 12C₁ of the third detection light source section 12C within the XY plane.

When this detection principle is mathematically described using an optical path function, this is as follows. First, in the above differential movement, when the driving current for the outer light-emitting element 12A₁ of the first detection light source section 12A when the light-receiving intensities in the photodetector 30 become equal to each other is defined as $I_A$, the driving current for the outer light-emitting element 12C₁ of the third detection light source section 12C is defined as $I_C$, and the ratio of a distance function which leads to the photodetector 30 via the target object Ob from the outer light-emitting element 12A₁ of the first detection light source section 12A and a distance function which leads to the photodetector 30 via the target object Ob from the outer light-emitting element 12C₁ of the third detection light source section 12C is defined as $P_{AC}$, the ratio $P_{AC}$ is basically obtained according to the following expression:

$$P_{AC} = I_C/I_A.$$

Accordingly, it can be seen that the target object Ob position is located on an equal ratio line passing through a position obtained by dividing a line which connects the outer light-emitting element 12A₁ of the first detection light source section 12A and the outer light-emitting element 12C₁ of the third detection light source section 12C by a predetermined ratio.

This model will be mathematically described. First, respective parameters are defined as follows.

T=Reflectivity of target object Ob

At=Distance function when detection light L2 emitted from outer light-emitting element 12A1 of first detection light source section 12A is reflected by target object Ob and reaches photodetector 30

A=Detection intensity of photodetector 30 when outer light-emitting element 12A1 of first detection light source section 12A is turned up in a state where target object Ob exists in detection space 10R.

Ct=Distance function when detection light L2 emitted from outer light-emitting element 12C1 of third light source section 12C is reflected by target object Ob and reaches photodetector 30

C=Detection intensity of photodetector 30 when outer light-emitting element 12C1 of third detection light source section 12C is turned up in a state where target object Ob exists in detection space 10R.

In addition, although the emission intensity of the outer light-emitting element 12A₁ of the first detection light source section 12A and the emission intensity of the outer light-emitting element 12C₁ of the third detection light source section 12C are expressed by the product of a driving current and an emission coefficient, the emission coefficient is set to 1 in the following description.

Additionally, when the above-mentioned differential movement is performed in a state where the target object Ob exists in the detection space 10R, the following relationships are obtained.

$$A = T \times A_t \times I_A + \text{Environmental light} \quad (1)$$

$$C = T \times C_t \times I_C + \text{Environmental light} \quad (2)$$

Here, since the detection intensity of the photodetector 30 is equal during differential movement, the following expressions are derived from Expressions (1) and (2).

$$T \times A_t \times I_A + \text{Environmental light} = T \times C_t \times I_C + \text{Environmental light}$$

$$T \times A_t \times I_A = T \times C_t \times I_C \quad (3)$$

Additionally, since the ratio $P_{AC}$ of the distance functions $A_t$ and $C_t$ is defined by the following expression:

$$P_{AC} = A_t/C_t \quad (4),$$

the ratio of the distance function $P_{AC}$ is expressed as shown below from Expressions (3) and (4):

$$P_{AC} = I_C/I_A \quad (5).$$

In this Expression (5), the item of the environmental light and the item of the reflectivity of the target object Ob do not exist. Therefore, the environmental light and the reflectivity of the target object Ob do not influence the ratio $P_{AC}$ of the optical path coefficients $A_t$ and $C_t$. In addition, the correction for offsetting the influence or the like of the detection light L2 which has been incident without being reflected by the target object Ob may be performed on the above mathematical model.

Here, a light source used in the detection light source section 12 is a point light source, and the optical intensity thereof at a certain point is inversely proportional to the square of a distance from the light source. Accordingly, the ratio of the separation distance P1 between the outer light-emitting element $12A_1$ of the first detection light source section 12A and the target object Ob and the separation distance P2 between the outer light-emitting element $12C_1$ of the third detection light source section 12C and the target object Ob is obtained according to the following expression:

$$P_{AC}=(P1)^2:(P2)^2.$$

Therefore, it can be seen that the target object Ob position is located on an equal ratio line passing through a position obtained by dividing an imaginary line which connects the outer light-emitting element $12A_1$ of the first detection light source section 12A and the outer light-emitting element $12C_1$ of the third detection light source section 12C in P1:P2.

Similarly, if the outer light-emitting element $12B_1$ and the outer light-emitting element $12D_1$ are differentially moved and the ratio of the distance between the outer light-emitting element $12B_1$ and the target object Ob and the distance between the outer light-emitting element $12D_1$ and the target object Ob is obtained, it can be seen that the target object Ob exists on an equal ratio line passing through a position which divides an imaginary line which connects the outer light-emitting element $12B_1$ and the outer light-emitting element $12D_1$ by a predetermined ratio. Therefore, the X coordinate and Y coordinate of the target object Ob can be detected. In addition, the above method is a method of geometrically describing the principle adopted in the present embodiment. In practice, calculation is performed using the obtained data.

If the inside/outside determination described with reference to FIGS. 3A to 3E is performed in detecting the X coordinate and the Y coordinate in this way, when an imaginary line which connects the outer light-emitting element $12A_1$ and the outer light-emitting element $12C_1$ is divided, and when an imaginary line which connects the outer light-emitting element $12B_1$ and the outer light-emitting element $12D_1$ is divided, proper division can be performed if it is known whether the target object Ob is located inside or outside the first detection light source section 12A to the fourth detection light source section 12D. Therefore, the X coordinate and Y coordinate of the target object Ob can be detected with high precision.

Differential Movement Between Reference Light Lr and Detection Light L2

Figure 5A:
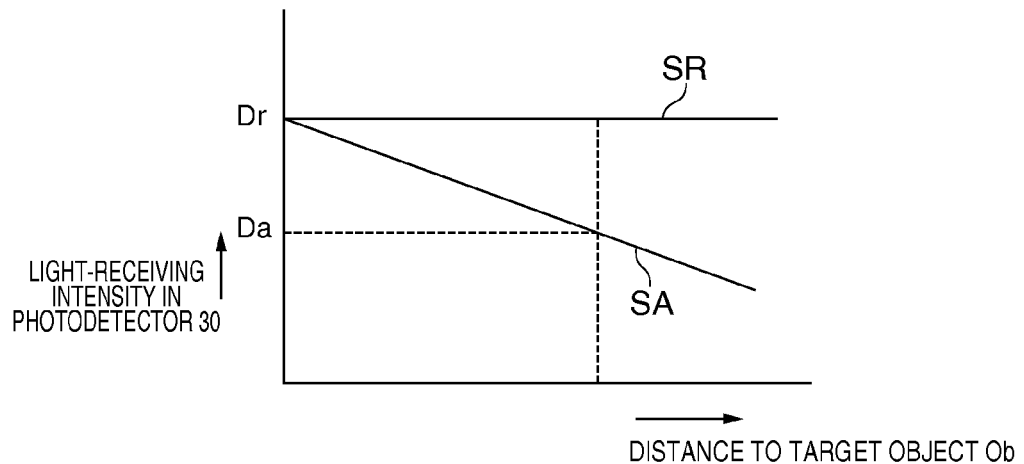
FIGS. 5A and 5B are explanatory views showing a principle that the position of a target object is detected using the differential movement between reference light and detection light, in the optical position detecting device.
Figure 5B:
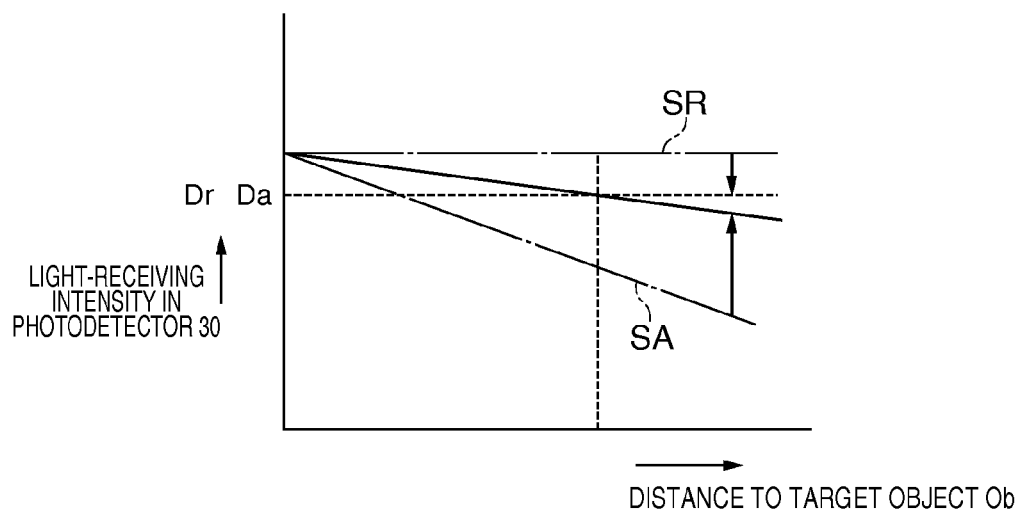

FIGS. 5A and 5B are explanatory views showing a principle that the position of a target object Ob is detected using the differential movement between the reference light Lr and the detection light L2, in the optical position detecting device 10 to which the invention is applied, and FIGS. 5A and 5B are an explanatory view showing the relationship between the distance from the detection light source section 12 to the target object Ob and the light-receiving intensity of the detection light L2 or the like, and an explanatory view showing an aspect after a driving current to a light source is adjusted.

In the optical position detecting device 10 of the present embodiment, the differential movement between the detection light L2a and the reference light Lr and the differential movement between the detection light L2c and the reference light Lr are used instead of the direct differential movement between the detection light L2a and the detection light L2c, and eventually the same result as the principle described with reference to FIGS. 4A and 4B is derived. Here, the differential movement between the detection light L2a and the reference light Lr and the differential movement between the detection light L2c and the reference light Lr are executed as follows.

As shown in FIG. 5A, in a state where the target object Ob exists in the detection space 10R, the distance to the target object Ob from the outer light-emitting element $12A_1$ of the first detection light source section 12A, and the light-receiving intensity $D_a$ of the detection light L2a in the photodetector 30 vary monotonously as shown by a solid line SA. On the other hand, the detection intensity in the photodetector 30 of the reference light Lr emitted from the reference light source 12R is constant irrespective of the position of the target object Ob as shown by a solid line SR. Accordingly, the light-receiving intensity $D_a$ of the detection light L2a in the photodetector 30 and the detection intensity $D_r$ of the reference light Lr in the photodetector 30 are different from each other.

Next, as shown in FIG. 5B, at least one of a driving current for the outer light-emitting element $12A_1$ of the first detection light source section 12A and a driving current for the reference light source 12R is adjusted, and the light-receiving intensity $D_a$ of the detection light L2a in the photodetector 30 and the detection intensity $D_r$ in the photodetector 30 of the reference light Lr are made to coincide with each other. Such a differential movement is performed between the reference light Lr and the detection light L2a and is performed between the reference light Lr and the detection light L2c. Accordingly, it is possible to obtain the ratio of a driving current for the outer light-emitting element $12A_1$ of the first detection light source section 12A and a driving current for the outer light-emitting element $12C_1$ of the third detection light source section 12C when a detection result of the detection light L2a or L2c (detection light L3a or L3c reflected by the target object Ob) in the photodetector 30 and a detection result of the reference light Lr in the photodetector 30 become equal each other. Therefore, it can be detected whether the target object Ob exists in any position between the first detection light source section 12A and the third detection light source section 12C.

When the above detection principle is mathematically described using an optical path function, this as follows. First, respective parameters are defined as follows.

T=Reflectivity of target object Ob $A_t$=Distance function when detection light L2 emitted from outer light-emitting element 12A1 of first detection light source section 12A is reflected by target object Ob and reaches photodetector 30

A=Detection intensity of photodetector 30 when outer light-emitting element 12A1 of first detection light source section 12A is turned up in a state where target object Ob exists in detection space 10R.

$C_t$=Distance function when detection light L2 emitted from outer light-emitting element 12C1 of third detection light source section 12C is reflected by target object Ob and reaches photodetector 30

C=Detection intensity of photodetector 30 when outer light-emitting element 12C1 of third detection light source section 12C is turned up in a state where target object Ob exists in detection space 10R.

$R_s$=Optical path coefficient from reference light source 12R to photodetector 30

R=Detection intensity of photodetector 30 when only reference light source 12R is turned up.

In addition, although the emission intensity of the outer light-emitting element $12A_1$ of the first detection light source section 12A, the emission intensity of the outer light-emitting element $12C_1$ of the third detection light source section 12C, and the emission intensity of the reference light source 12R are expressed by the product of a driving current and an emission coefficient, the emission coefficient is set to 1 in the following description. Additionally, when the light-receiving intensities in the photodetector 30 become equal to each other in the above differential movement, the driving current for the outer light-emitting element $12A_1$ of the first detection light source section 12A is defined as $I_A$, the driving current for the outer light-emitting element $12C_1$ of the third detection light source section 12C is defined as $I_C$, and the driving current for the reference light source 12R is defined as $I_R$. Additionally, it is assumed that the detection intensity of the photodetector 30 when only the reference light source 12R is turned up during differential movement is the same in the differential movement from the outer light-emitting element $12A_1$ of the first detection light source section 12A and in the differential movement from the outer light-emitting element $12C_1$ of the third detection light source section 12C.

Additionally, when the above-mentioned differential movement is performed in a state where the target object Ob exists in the detection space 10R, the following relationships are obtained.

$$A = T \times A_t \times I_A + \text{Environmental light} \quad (6)$$

$$C = T \times C_t \times I_C + \text{Environmental light} \quad (7)$$

$$R = R_S \times I_R + \text{Environmental light} \quad (8)$$

Here, since the detection intensity of the photodetector 30 is equal during differential movement, the following expressions are derived from Expressions (6) and (8):

$$T \times A_t \times I_A + \text{Environmental light} = R_S \times I_R + \text{Environmental light}$$

$$T \times A_t \times I_A = R_S \times I_R$$

$$T \times A_t = R_S \times I_R / I_A \quad (9)$$

and, the following expressions are derived from expressions (7) and (8):

$$T \times C_t \times I_C + \text{Environmental light} = R_S \times I_R + \text{Environmental light}$$

$$T \times C_t \times I_C = R_S \times I_R$$

$$T \times C_t = R_S \times I_R / I_C \quad (10).$$

Additionally, since the ratio $P_{AC}$ of the distance functions $A_t$ and $C_t$ is defined by the following expression:

$$P_{AC} = A_t / C_t \quad (11),$$

the ratio of the distance function $P_{AC}$ is expressed as shown below from Expressions (9) and (10):

$$P_{AC} = I_C / I_A \quad (12).$$

In this Expression (12), the item of the environmental light and the item of the reflectivity of the target object Ob do not exist. Therefore, the environmental light and the reflectivity of the target object Ob do not influence the ratio $P_{AC}$ of the optical path coefficients $A_t$ and $C_t$. In addition, the correction for offsetting the influence or the like of the detection light L2 which has been incident without being reflected by the target object Ob may be performed on the above mathematical model. Additionally, even when the detection intensity of the photodetector 30 when only the reference light source 12R is turned up is set to a different value in the differential movement from the outer light-emitting element $12A_1$ of the first detection light source section 12A, and the differential movement from the outer light-emitting element $12C_1$ of the third detection light source section 12C, the same principle is basically established.

Here, a light source used in the detection light source section 12 is a point light source, and the optical intensity thereof at a certain point is inversely proportional to the square of a distance from the light source. Accordingly, the ratio of the separation distance P1 between the outer light-emitting element $12A_1$ of the first detection light source section 12A and the target object Ob and the separation distance P2 between the outer light-emitting element $12C_1$ of the third detection light source section 12C and the target object Ob is obtained according to the following expression:

$$P_{AC} = (P1)^2 : (P2)^2.$$

Therefore, it can be seen that the target object Ob position is located on an equal ratio line passing through a position obtained by dividing an imaginary line which connects the outer light-emitting element $12A_1$ of the first detection light source section 12A and the outer light-emitting element $12C_1$ of the third detection light source section 12C in P1:P2.

Similarly, if the ratio of the distance between the outer light-emitting element $12B_1$ and the target object Ob and the distance between the outer light-emitting element $12D_1$ and the target object Ob is obtained using the differential movement between the outer light-emitting element $12B_1$ and the reference light source 12R and the differential movement between the outer light-emitting element $12D_1$ and the reference light source 12R, it can be seen that the target object Ob exists on an equal ratio line passing through a position which divides an imaginary line which connects the outer light-emitting element $12B_1$ and the outer light-emitting element $12D_1$ by a predetermined ratio. Therefore, the XY coordinates of the target object Ob can be detected.

If the inside/outside determination described with reference to FIGS. 3A to 3E is performed in detecting the X coordinate and the Y coordinate in this way, when an imaginary line which connects the outer light-emitting element $12A_1$ and the outer light-emitting element $12C_1$ is divided, and when an imaginary line which connects the outer light-emitting element $12B_1$ and the outer light-emitting element $12D_1$ is divided, proper division can be performed if it is known whether the target object Ob is located inside or outside the first detection light source section 12A to the fourth detection light source section 12D. Therefore, the X coordinate and Y coordinate of the target object Ob can be detected with high precision.

Figures 6A, 6B:
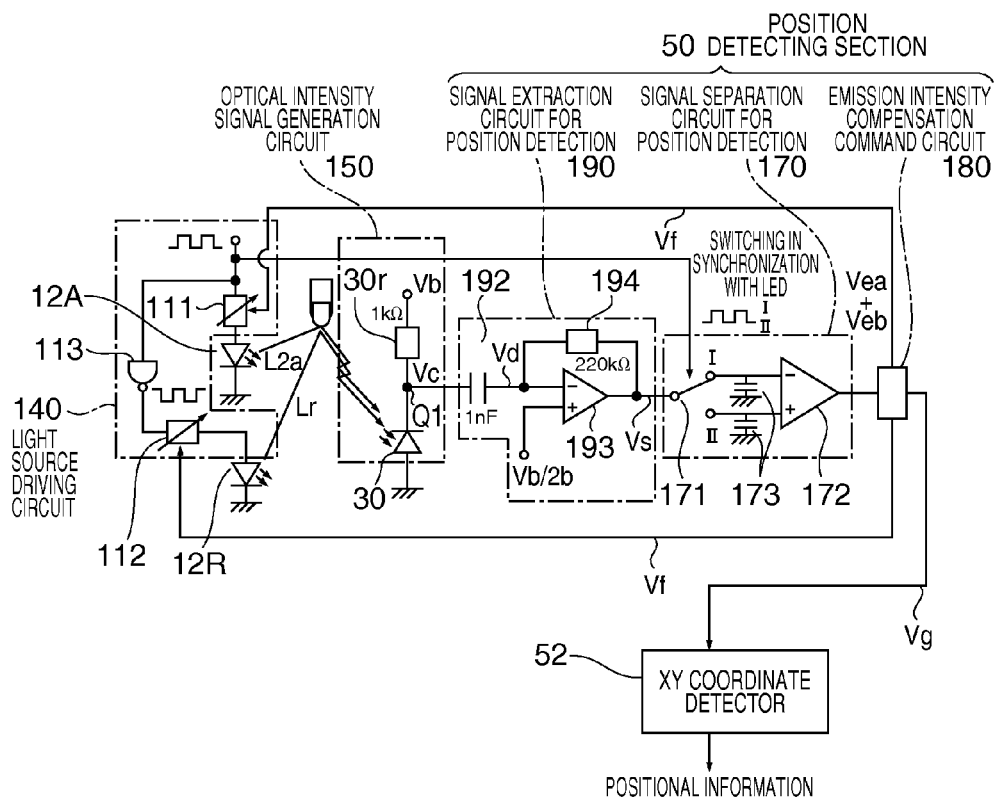
FIGS. 6A and 6B are explanatory views showing the contents of processing performed by a position detecting section, in the optical position detecting device.

Configuration Example of Position Detecting Section 50 for Differential Movement FIGS. 6A and 6B are explanatory views showing the contents of processing performed by the position detecting section 50, in the optical position detecting device 10 to which the invention is applied.

In carrying out the above differential movement, it is possible to adopt a configuration in which processing is performed by using a microprocessor unit (MPU) as the position detecting section 50, and thereby, executing predetermined software (operation program). Additionally, it is also possible to adopt a configuration in which processing is performed in a signal processor using hardware, such as a logical circuit, as will be described below with reference to FIGS. 6A and 6B. In addition, although the differential movement described with reference to FIGS. 5A and 5B is shown in FIGS. 6A and 6B, if the reference light source 12R is replaced with the second detection light source section 12B, the invention can be applied to the differential movement described with reference to FIGS. 4A and 4B.

As shown in FIG. 6A, in the optical position detecting device 10 of the present embodiment, the light source driving circuit 140 applies a driving pulse of a predetermined current value to the first detection light source section 12A via a variable resistance 111, and applies a driving pulse of a predetermined current value to the reference light source 12R via a variable resistance 112 and an inverting circuit 113. For this reason, since reversed-phase driving pulses are applied to the first detection light source section 12A and the reference light source 12R, the first detection light source section 12A and the reference light source 12R are alternately turned on. Also, when the first detection light source section 12A is turned on, the light reflected by the target object Ob in the detection light L2a is received in the photodetector 30, and when the reference light source 12R is turned up, the reference light Lr is received in the photodetector 30. In the optical intensity signal generation circuit 150, a resistor 30r of about 1 kΩ is electrically connected in series to the photodetector 30, and a bias voltage Vb is applied to both ends thereof.

In the optical intensity signal generation circuit 150, the position detecting section 50 is electrically connected to a connection point Q1 between the photodetector 30 and the resistor 30r. A detection signal Vc output from the connection point Q1 between the photodetector 30 and the resistor 30r is expressed by the following expression:

$$Vc = V30/(V30 + \text{resistance value of resistor } 30r)$$

V30: equivalent resistance value of photodetector 30. Accordingly, when a case where the environmental light Lc does not enter the photodetector 30 is compared with a case where the environmental light Lc enters the photodetector 30, the level and amplitude of the detection signal Vc become large in the case where the environmental light Lc enters the photodetector 30.

The position detecting section 50 generally includes a signal extraction circuit 190 for position detection, a signal separation circuit 170 for position detection, and an emission intensity compensation command circuit 180. The signal extraction circuit 190 for position detection includes a filter 192 of a capacitor of about 1 nF, and the filter 192 functions as a high-pass filter which removes a direct-current component from a signal output from the connection point Q1 between the photodetector 30 and the resistor 30r. For this reason, only a position detection signal Vd by the photodetector 30 is extracted from the detection signal Vc output from the connection point Q1 between the photodetector 30 and the resistor 30r by the filter 192. That is, since it can be regarded that the detection light L2a and the reference light Lr are modulated, whereas the environmental light Lc has an intensity being constant within a certain period, a low-frequency component or direct-current component resulting from the environmental light Lc is removed by the filter 192.

Additionally, the signal extraction circuit 190 for position detection has an adder circuit 193 including a feedback resister 194 of about 220 kΩ in a subsequent stage of the filter 192, and the position detection signal Vd extracted by the filter 192 is output to the signal separation circuit 170 for position detection as a position detection signal Vs on which a voltage V/2 of ½ times the bias voltage Vb is overlapped.

The signal separation circuit 170 for position detection includes a switch 171 which performs a switching operation in synchronization with a driving pulse applied to the first detection light source section 12A, a comparator 172, and a capacitor 173 which is electrically connected to an input line of the comparator 172. For this reason, when the position detection signal Vs is input to the signal separation circuit 170 for position detection, an effective value Vea of the position detection signal Vs when the first detection light source section 12A is turned up and an effective value Veb of the position detection signal Vs when the reference light source 12R is turned up are alternately output to the emission intensity compensation command circuit 180 from the signal separation circuit 170 for position detection.

The emission intensity compensation command circuit 180 compares the effective values Vea and Veb with each other, performs the processing shown in FIG. 6B, and outputs a control signal Vf to the light source driving circuit 140 so that the effective value Vea of the position detection signal Vs and the effective value Veb of the position detection signal Vs become the same level. That is, the emission intensity compensation command circuit 180 compares the effective value Vea of the position detection signal Vs with the effective value Veb of the position detection signal Vs, and maintains the present driving conditions in a case where the effective values are equal to each other. On the other hand, in a case where the effective value Vea of the position detection signal Vs is lower than the effective value Veb of the position detection signal Vs, the emission intensity compensation command circuit 180 reduces the resistance value of the variable resistance 111, and increases the quantity of the light emitted from the first detection light source section 12A. Additionally, in a case where the effective value Veb of the position detection signal Vs is lower than the effective value Vea of the position detection signal Vs, the emission intensity compensation command circuit 180 reduces the resistance value of the variable resistance 112, and increases the quantity of the light emitted from the reference light source 12R.

In this way, in the optical position detecting device 10, the controlled variables (driving currents) of the first detection light source section 12A and the reference light source 12R are controlled by the emission intensity compensation command circuit 180 of the position detecting section 50 so that the amounts of detection by the photodetector 30 during the turn-on operation of the first detection light source and the turn-on operation of the reference light source become equal to each other. Accordingly, information on the driving currents for the first detection light source section 12A and the reference light source section 12R so that the amounts of detection by the photodetector 30 during the turn-on operation of the first detection light source and the turn-on operation of the reference light source become equal to each other exist in the emission intensity compensation command circuit 180, and this information is output to the position detecting section 50 as a position detection signal Vg.

The same processing is performed even between the second detection light source section 12B, and the reference light source 12R, and the signal Vg for position detection which is output from the emission intensity compensation command circuit 180 is information on the driving currents for the second detection light source section 12B and the reference light source section 12R so that the amounts of detection by the photodetector 30 during the turn-on operation of the second detection light source section and the turn-on operation of the reference light source become equal to each other.

Detection of Z Coordinate

In the optical position detecting device 10 of the present embodiment, when the first detection light source section 12A to the fourth detection light source section 12D are simultaneously turned on, a light intensity distribution for Z coordinate detection in which intensity decreases monotonously in the normal direction to the first surface 41 are formed on the first surface 41 side (detection space 10R) of the translucent member 40. In this light intensity distribution for Z coordinate detection, intensity decreases monotonously as it separates from the first surface 41 of the translucent member 40. Accordingly, in the Z coordinate detector 53 of the position detecting section 50, the Z coordinate of the target object Ob can be detected on the basis of the difference or ratio of the detection values in the photodetector 30 when the reference light source 12R, and the first detection light source section 12A to the fourth detection light source section 12D are alternately turned on. Additionally, in the Z coordinate detector 53 of the position detecting section 50, the Z coordinate of the target object Ob can be detected on the basis of the difference or ratio of the driving current for the reference light source 12R and the driving currents for the first detection light source section 12A to the fourth detection light source section 12D when the detection values in the photodetector 30 when the reference light source 12R and the first detection light source section 12A to the fourth detection light source section 12D are alternately turned on become equal to each other.

MAIN EFFECTS OF PRESENT EMBODIMENT

As described above, in the optical position detecting device 10 of the present embodiment, the light source driving section 14 turns on the plurality of detection light source sections 12 sequentially, and the photodetector 30 receives the detection light L3 reflected by the target object Ob during that time. Accordingly, if a detection result in the photodetector 30 is directly used, or a driving current when the two detection light source sections 12 are differentially moved via the photodetector 30 is used, the position detecting section 50 can detect the position of the target object Ob. Here, as seen from the detection space 10R, the photodetector 30 is located inside the plurality of detection light source sections 12, the plurality of detection light source sections 12 includes the outer light-emitting elements $12A_1$ to $12D_1$ and the inner light-emitting elements $12A_2$ to $12D_2$, respectively. Accordingly, the position detecting section 50 can determine whether the target object Ob is located either outside or inside the detection light source sections on the basis of comparison results between the light-receiving intensities in the photodetector 30 when the outer light-emitting elements $12A_1$ to $12D_1$ are turned on and the light-receiving intensities in the photodetector 30 when the inner light-emitting elements $12A_2$ to $12D_2$ are turned on. For this reason, when the ratio of the distance between one detection light source section 12 of the two detection light source sections 12 and the target object Ob and the distance between the other detection light source section 12 and the target object Ob is obtained, the distance between the two detection light source sections 12 may be internally divided to specify the position of the target object Ob. However, there is no doubt whether the distance between the two detection light source sections 12 may be externally divided to specify the position of the target object Ob. Therefore, the position of the target object Ob can be accurately detected.

Additionally, in the present embodiment, since the differential movement in the two detection light source sections 12 or the differential movement between the detection light source section 12 and the reference light source 12R is used, the influence of environmental light or the like can be automatically corrected.

Moreover, since the detection light L2 is infrared light, the detection light is not viewed. Accordingly, the optical position detecting device 10 can be used for various apparatuses, so as not to hinder the display even in a case where the optical position detecting device 10 of the present embodiment is applied to a display apparatus.

OTHER EMBODIMENTS

Although the outer light-emitting elements 12A1 to 12D1 are turned on when a differential movement is performed in the above embodiment, the inner light-emitting elements 12A2 to 12D2 may be turned on. Additionally, the outer light-emitting elements 12A1 to 12D1 and the inner light-emitting elements 12A2 to 12D2 may be turned on.

Example of Use of Optical Position Detecting Device 10

Figure 7A:
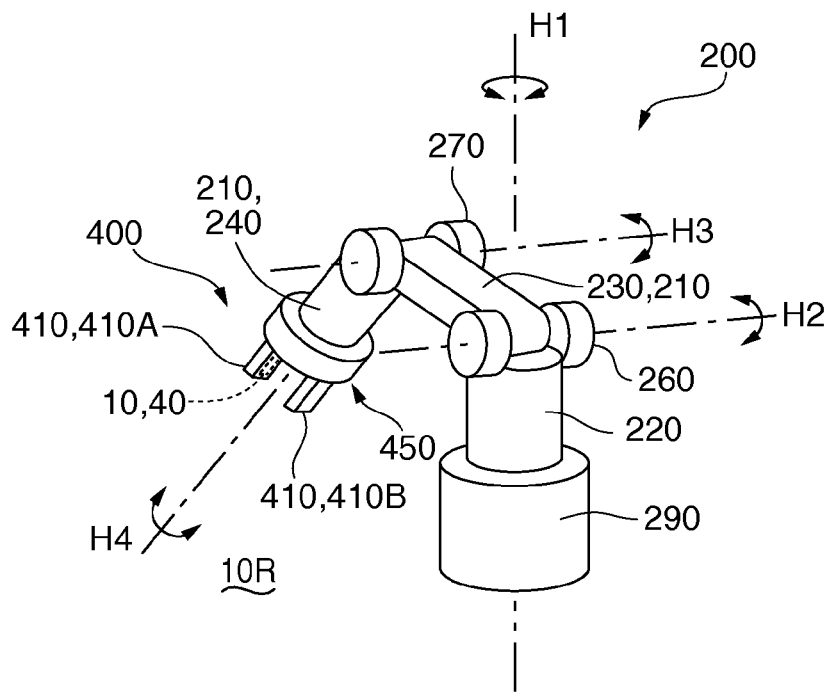
FIGS. 7A and 7B are explanatory views of a robot arm in which a hand unit is provided with the optical position detecting device.
Figure 7B:
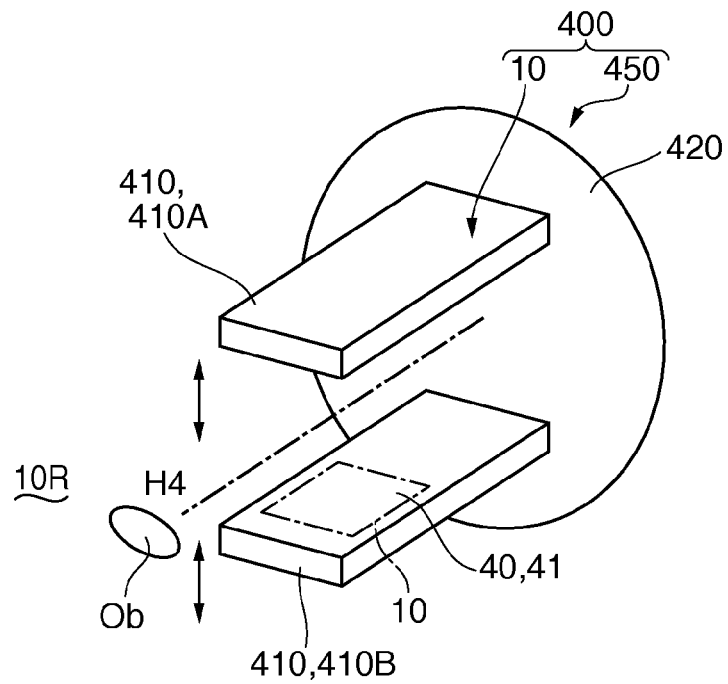

A robot hand unit using the optical position detecting device 10 to which the invention is applied as a tactile sensor will be described with reference to FIGS. 7A and 7B. FIGS. 7A and 7B are explanatory views of a robot arm provided at the hand unit using the optical position detecting device 10 to which the invention is applied as a tactile sensor, and FIGS. 7A and 7B are an explanatory view of the overall robot arm, and an explanatory view of the hand unit.

The robot arm 200 shown in FIG. 7A is an apparatus which performs supply, extraction, or the like of workpieces or tools with respect to a numerically controlled machine tool, and includes a strut 220 erected from a base 290, and an arm 210. In the present embodiment, the arm 210 includes a first arm portion 230 coupled with a tip portion of the strut 220 via a first joint 260, and a second arm portion 240 coupled with a tip portion of the first arm portion 230 via a second joint 270. The strut 220 is rotatable around an axis H1 perpendicular to the base 290, the first arm portion 230 is rotatable around an axis H2 by the first joint 260 at the tip portion of the strut 220, and the second arm portion 240 is rotatable around an axis H3 by the second joint 270 at the tip portion of the first arm portion 230. A hand 450 of the hand unit 400 is coupled with the tip portion of the second arm portion 240, and the hand 450 is rotatable around an axis H4 of the second arm portion 240.

As shown in FIG. 7B, the hand unit 400 has the hand 450 including a plurality of grip claws 410 (gripper), and the hand 450 includes a disk-shaped grip claw support 420 holding the roots of the plurality of grip claws 410. In the present embodiment, the hand 450 includes a first grip claw 410A and a second grip claw 410B as the plurality of grip claws 410. Both of the two grip claws 410 are movable in a direction in which the grip claws are separated from each other and in a direction in which the grip claws approach each other, as shown by an arrow H4.

In the robot arm 200 configured in this way, when the target object Ob is gripped, the two grip claws 410 move in the direction in which the grip claws approach each other, thereby gripping the target object Ob after the strut 220, the first arm portion 230, and the second arm portion 240 rotate in a predetermined direction to make the hand 450 approach the target object Ob (a workpiece).

Here, the inner surface of each grip claw 410 which comes in contact with the target object Ob when the target object Ob (the workpiece) is gripped includes the first surface of the translucent member 40 of the optical position detecting device 10 described in the above embodiment. Accordingly, when the grip claws 410 grip the target object Ob, the optical position detecting device 10 detects the relative position or position of the target object Ob and the grip claw 410, and this detection result is fed back to a driving controller of the grip claws 410. Therefore, the grip claws 410 can be made to approach the target object Ob at high speed, and an increase in the speed of a workpiece gripping operation can be realized.

What is claimed is:

1. An optical position detecting device comprising:
a translucent member that has first and second surfaces opposite to each other;
a plurality of light source sections that have first and second sets of light source sections, that emit detection light and that are located in a first area next to the first surface of the translucent member so as to be separated in a first direction intersecting an emitting direction of the detection light;
a light detection section that is located in the first area and that receives reflected light reflected by a target object located in a second area next to the second surface of the translucent member;
a light source driving section that alternately turns on the first set of light source sections and the second set of light source sections; and
a position detecting section that determines a position of the target object based on first intensity of reflected light that is formed by the detection light emitted by the first set of light source sections and second intensity of the reflected light that is formed by the detection light emitted by the second set of light source sections,
wherein the light detection section is surrounded by the plurality of light source sections in the first direction,
wherein each of the first set of light source sections is located closer to the light detection section than each of the second set of light source sections, and
wherein the position detecting section determines the position of the target object by comparing between the first intensity and the second intensity.

2. The optical position detecting device according to claim 1,
wherein when the detection light emitted by the first set of light source sections and the detection light emitted by the second set of light source sections are equal intensity, the position detecting section:
determines that the target object is located closer to the second set of light source sections than an intermediate position between the first set of light source sections and the second set of light source sections if the second intensity is larger than the first intensity, and
determines that the target object is located closer to the first set of light source sections than the intermediate position second intensity is smaller than the first intensity.

3. The optical position detecting device according to claim 2,
wherein when the emitting direction of the detection light is defined as a Z-axis direction, and two directions perpendicularly intersecting the Z-axis direction are defined as an X-axis direction and a Y-axis direction, and the plurality of light source sections includes two first light source sections separated in the X-axis direction and two second light source sections separated in the Y-axis direction.

4. The optical position detecting device according to claim 1,
wherein the position detecting section determines the position of the target object based on third intensity of the reflected light obtained by differentially moving some of the light source sections and the other of the light source sections of the plurality of light source sections.

5. The optical position detecting device according to claim 1, further comprising a reference light source section that emits reference light toward the light detection section and that is located in the first area,
wherein the position detecting section determines the position of the target object based on fourth intensity of the reflected light obtained by changing and differentially moving combinations of some of the light source sections of the plurality of light source sections and the reference light source section.

6. The optical position detecting device function according to claim 1,
wherein the detection light is infrared light.

7. A robot hand comprising:
a plurality of grip claws adapted to grip a target object;
a grip claw holding portion which holds the plurality of grip claws;
a translucent member that has first and second surfaces opposite to each other, the second surface is a surface of one of the plurality of grip claws;
a plurality of light source sections that have first and second sets of light source sections, that emit detection light and that are located in a first area next to the first surface of the translucent member so as to be separated in a first direction intersecting an emitting direction of the detection light;
a light detection section that is located in the first area and that receives reflected light reflected by the target object located in a second area next to the second surface of the translucent member;
a light source driving section that alternately turns on the first set of light source sections and the second set of light source sections; and
a position detecting section that determines a position of the target object based on first intensity of the reflected light that is formed by the detection light emitted by the first set of light source sections and second intensity of the reflected light that is formed by the detection light emitted by the second set of light source section,
wherein the light detection section is surrounded by the plurality of light source sections in the first direction,
wherein each of the first set of light source sections is located closer to the light detection section than each of the second set of light source sections, and
wherein the position detecting section determines the position of the target object by comparing between the first intensity and the second intensity.

8. The robot hand according to claim 7,
wherein when the detection light emitted by the first set of light source sections and the detection light emitted by the second set of light source sections are equal intensity, the position detecting section:
determines that the target object is located closer to the second set of light source sections than an intermediate position between the first set of light source sections and the second set of light source sections if the second intensity is larger than the first intensity, and
determines that the target object is located closer to the first set of light source sections than the intermediate position if the second intensity is smaller than the first intensity.

9. The robot hand according to claim 8,
wherein when the emitting direction of the detection light is defined as a Z-axis direction, and two directions perpendicularly intersecting the Z-axis direction are defined as an X-axis direction and a Y-axis direction, and the plurality of light source sections includes two first light source sections separated in the X-axis direction and two second light source sections separated in the Y-axis direction.

10. A robot arm comprising:

a plurality of grip claws adapted to grip a target object;

a grip claw holding portion which holds the plurality of grip claws;

an arm portion which is rotatably coupled with the grip claw holding portion;

a translucent member that has first and second surfaces opposite to each other, the second surface is a surface of one of the plurality of grip claws;

a plurality of light source sections that have first and second sets of light source sections, that emit detection light and that are located in a first area next to the first surface of the translucent member so as to be separated in a first direction intersecting an emitting direction of the detection light;

a light detection section that is located in the first area and that receives reflected light reflected by the target object located in a second area next to the second surface of the translucent member;

a light source driving section that alternately turns on the first set of light source sections and the second set of light source sections; and a position detecting section that determines a position of the target object based on first intensity of the reflected light that is formed by the detection light emitted by the first set of light source sections and second intensity of the reflected light that is formed by the detection light emitted by the second set of light source sections, wherein the light detection section is surrounded by the plurality of light source sections in the first direction, wherein each of the first set of light source sections is located closer to the light detection section than each of the second set of light source sections, and wherein the position detecting section determines the position of the target object by comparing between the first intensity and the second intensity.

11. The robot arm according to claim 10, wherein when the detection light emitted by the first set of light source sections and the detection light emitted by the second set of light source sections are equal intensity, the position detecting section:

determines that the target object is located closer to the second set of light source sections than an intermediate position between the first set of light source sections and the second set of light source sections if the second intensity is larger than the first intensity, and determines that the target object is located closer to the first set of light source sections than the intermediate position if the second intensity is smaller than the first intensity.

12. The robot arm according to claim 11, wherein when the emitting direction of the detection light is defined as a Z-axis direction, and two directions perpendicularly intersecting the Z-axis direction are defined as an X-axis direction and a Y-axis direction, and the plurality of light source sections includes two first light source sections separated in the X-axis direction and two second light source sections separated in the Y-axis direction.

* * * * *